(12) United States Patent
Nagel et al.

(10) Patent No.: US 10,941,613 B1
(45) Date of Patent: Mar. 9, 2021

(54) BUILDING MODEL GENERATION AND INTELLIGENT LIGHT CONTROL FOR SMART WINDOWS

(71) Applicant: Kinestral Technologies, Inc., Hayward, CA (US)

(72) Inventors: Paul Nagel, Hayward, CA (US); Wally Barnum, Hayward, CA (US); Stephen Coffin, Hayward, CA (US); Brandon Nichols, Hayward, CA (US); Antoine Dubois, Hayward, CA (US)

(73) Assignee: KINESTRAL TECHNOLOGIES, INC., Hayward, CA (US)

( * ) Notice: Subject to any disclaimer, the term of this patent is extended or adjusted under 35 U.S.C. 154(b) by 0 days.

(21) Appl. No.: 16/435,825

(22) Filed: Jun. 10, 2019

Related U.S. Application Data

(63) Continuation of application No. 14/994,092, filed on Jan. 12, 2016, now Pat. No. 10,316,581.

(60) Provisional application No. 62/202,514, filed on Aug. 7, 2015, provisional application No. 62/102,515, filed on Jan. 12, 2015, provisional application No. 62/102,516, filed on Jan. 12, 2015, provisional application No. 62/102,508, filed on Jan. 12, 2015.

(51) Int. Cl.
*E06B 9/24* (2006.01)
*G02F 1/163* (2006.01)
*E06B 9/68* (2006.01)

(52) U.S. Cl.
CPC .......... *E06B 9/24* (2013.01); *E06B 9/68* (2013.01); *G02F 1/163* (2013.01); *E06B 2009/2464* (2013.01); *E06B 2009/6809* (2013.01); *E06B 2009/6818* (2013.01); *E06B 2009/6827* (2013.01)

(58) Field of Classification Search
CPC ... G02F 1/163; E06B 9/24; E06B 9/68; E06B 2009/6818; E06B 2009/6827; E06B 2009/6809; E06B 2009/2464
USPC .......................................................... 52/1
See application file for complete search history.

(56) References Cited

U.S. PATENT DOCUMENTS

2015/0116811 A1\* 4/2015 Shrivastava ........... G08C 23/04
359/275
2017/0365908 A1\* 12/2017 Hughes .................... H01Q 1/12

\* cited by examiner

*Primary Examiner* — Vu A Vu
(74) *Attorney, Agent, or Firm* — Womble Bond Dickinson (US) LLP

(57) ABSTRACT

A smart window system is provided. The system includes a plurality of smart windows, each having at least one electrochromic window and a plurality of sensors. The system includes a control system coupling the plurality of smart windows and the plurality of sensors. The control system is configured to couple to a network, and configured to generate a building model that includes information regarding the plurality of smart windows and is based on information from the plurality of sensors and information from the network.

18 Claims, 14 Drawing Sheets

| Data Structure 702 ||||||||
|---|---|---|---|---|---|---|---|
| Building Model 602 ||||| Building Location Latitude, Longitude, GPS, Zip Code 706 |||
| Window # | Direction Facing | Story | Shade Constraint | Glare | Room | Preferences ||
| | | | | | | General | Personal |
| 1 | East | 1 | <11 AM | | BR 1 | ~ | ~ |
| 2 | South | 1 | None | Noon | DR | ~ | ~ |
| 3 | West | 1 | >3 PM | | LR | ~ | ~ |
| 4 | North | 1 | Always | | BR 2 | ~ | ~ |
| ⋮ | | 2 | | | | | |
| | | 2 | | | | | |
| | | 2 | | | | | |
| Building Front | South | 2 | | | | | |
| Building Back | North | 1 | | | | | |
| Building Side 1 | East | Split 1/2 | | | | | |
| Building Side 2 | West | Split 1/2 | | | | | |
| ⋮ | | | | | | | |

704 (top group), 708 (bottom group)

| Day/Night | Latitude Adjust On | Seasonal Adjust On |
|---|---|---|
| Weather Report Monitoring On |||
| Local Microclimate Adjust On |||

712

| Shade Model 640 | By Room | By Windows Per Room | Building Overall |
|---|---|---|---|
| Temperature Model 656 | | | |
| Lighting Model 710 | | | |

BUILDING MODEL GENERATION AND INTELLIGENT LIGHT CONTROL FOR SMART WINDOWS

BACKGROUND

Electrochromic devices, in which optical transmissivity is electrically controlled, are in current usage in building windows and in dimmable automotive rearview mirrors. Generally, electrochromic windows for a building are controlled with a driver and a user input, e.g., a dimmer control. Electrochromic rearview mirrors in automotive usage often have a light sensor aimed to detect light from headlights of automobiles, and are user-settable to engage an auto-dim function that adjusts the tint of the mirror based on input from the light sensor. There is a need in the art for a control system for electrochromic devices which goes beyond such basic settings and functions.

SUMMARY

In some embodiments, a smart window system is provided. The system includes a plurality of smart windows, each having at least one electrochromic window and a plurality of sensors. The system includes a control system coupling the plurality of smart windows and the plurality of sensors. The control system is configured to couple to a network, and configured to generate a building model that includes information regarding the plurality of smart windows and is based on information from the plurality of sensors and information from the network.

In some embodiments, a smart window system is provided. The system includes a plurality of smart windows, each smart window of the plurality of smart windows having integrated into the smart window at least one sensor and at least one electrochromic window. The system includes a control system that includes the plurality of smart windows and is configured to couple to a network. The control system is configured to produce a building model based on information from the network and based on information from sensors of the plurality of smart windows, wherein the building model includes information regarding placements of the plurality of smart windows relative to a building.

In some embodiments, a method of operating a smart window system, performed by one or more processors of the smart window system is provided. The method includes receiving sensor information from sensors of the smart window system, wherein the smart window system includes a plurality of smart windows with electrochromic windows, and the sensors. The method includes receiving information from a network and generating, in the smart window system, a building model referencing each smart window of the plurality of smart windows with placement, location or orientation of the smart window, wherein at least a portion of the building model is based on the sensor information and the information from the network. The method includes controlling each smart window of the plurality of smart windows, based on the building model.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 7 depicts a data structure suitable for holding the building model and other models and comparison engine of FIGS. 6A-6F in the distributed device network with smart windows.

DETAILED DESCRIPTION

A smart window system, disclosed herein, has a distributed device network control system architecture that can distribute control of optical transmissivity of smart windows across the smart windows, intelligent window controller/drivers, a command and communication device, and one or more resources on a network. The smart window system combines input from sensors integrated with the smart windows, user input, and information and direction from the network to control the smart windows in an interactive, adaptive manner. Control can shift from one component to another, be shared across multiple components, or be overridden by one component of the system, in various embodiments. The distributed nature of the architecture and the control support various system behaviors and capabilities. Some embodiments of the smart window system develop a building model, with shade modeling for the smart windows. Various embodiments of smart windows and operating scenarios for smart window systems are described herein.

Figure 1:
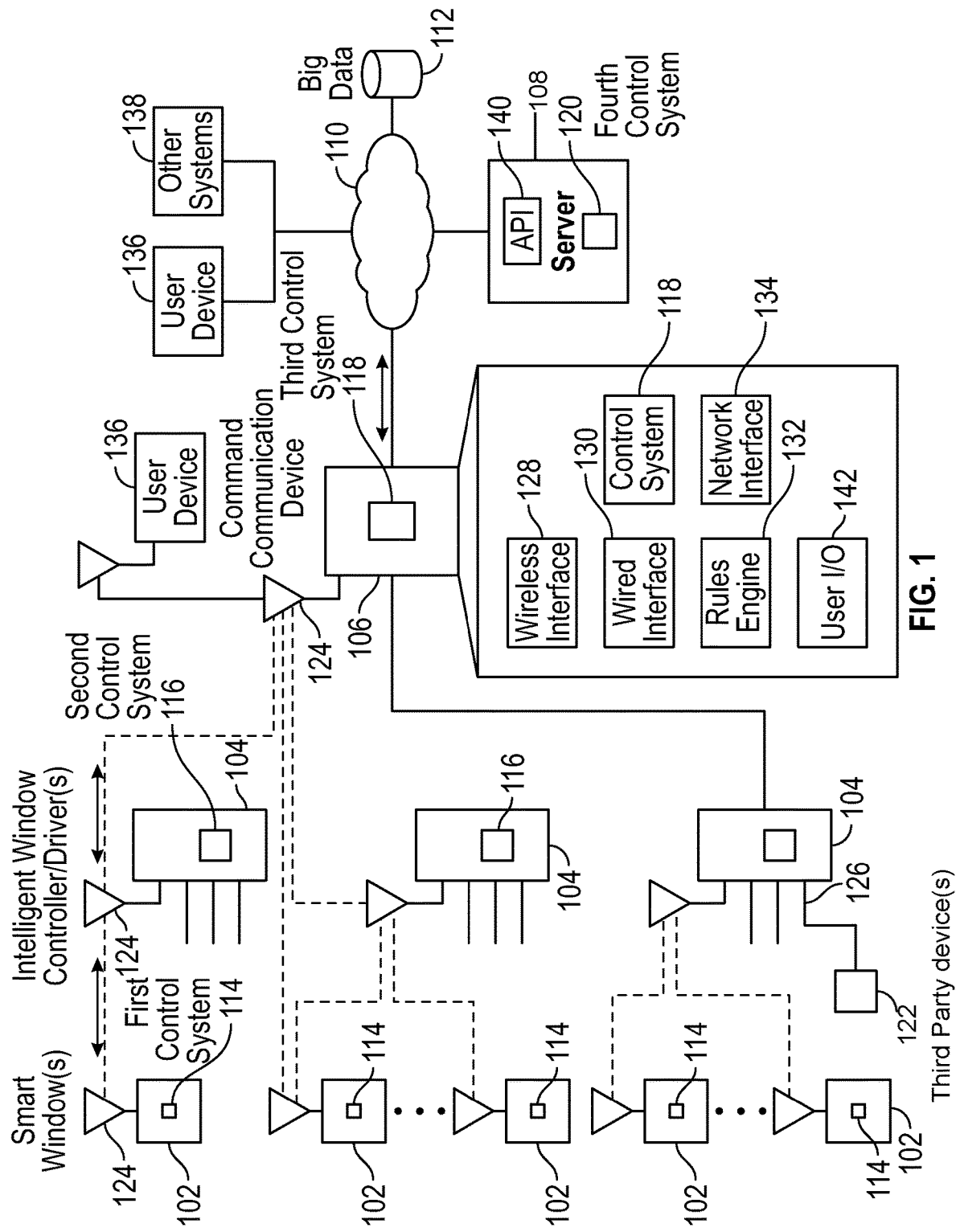
FIG. 1 is a system diagram of a smart window system that has a distributed device network control system architecture in accordance with an embodiment of the present disclosure.

FIG. 1 is a system diagram of a smart window system that has a distributed device network control system architecture in accordance with an embodiment of the present disclosure. The system is both modular and distributed, and is suitable for installation in various living, working or commercial spaces, such as an apartment, house, an office, a building, a store, a mall, etc. Modularity allows for replacement of individual components, upgrades, expansion, linking of two or more systems, and communication in the system and among multiple systems. Wireless couplings, wired couplings, and combinations thereof are supported by the smart window system. Although antennas 124 are shown for the wireless coupling, further embodiments could use infrared coupling.

Control is distributed across one or more first control systems 114, with one in each smart window 102, one or more second control systems 116, with one in each intelligent window controller/driver 104, a third control system 118 in a command and communication device 106, and a fourth control system 120 in a server 108 coupled to a network 110. Each smart window 102 has an antenna 124 and is thereby wirelessly connected to a nearby intelligent window controller/driver 104, also with an antenna 124. In further embodiments, a wired connection could be used. Each intelligent window controller/driver 104 is wirelessly connected to the command and communication device 106, which has an antenna 124. In further embodiments, a wired connection could be used. The command and communication device 106 is coupled to a network 110, such as the global communication network known as the Internet. This coupling could be made via a wireless router (e.g., in a home, office, business or building), or a wired network connection. User devices 136 (e.g., smart phones, computers, various computing and/or communication devices) can couple to the command and communication device 106, for example by a direct wireless connection or via the network 110, or can couple to the server 108 via the network 110, as can other systems 138 and big data 112. In some embodiments, the server 108 hosts an application programming interface 140. The server 108 could be implemented in or include, e.g., one or more physical servers, or one or more virtual servers implemented with physical computing resources, or combinations thereof.

Modularity of the system supports numerous layouts and installations. For example, each windowed room in a building could have one or more smart windows 102 and a single intelligent window controller/driver 104 for that room. An intelligent window controller/driver 104 could control smart windows 102 in part of a room, an entire room, or multiple rooms. The intelligent window controller/driver(s) 104 for that floor of the building, or for a portion of or the entire building in some embodiments, could tie into a single command and communication device 106, which is coupled to the network 110 and thereby coupled to the server 108. In a small installation, one or more smart windows 102 could couple to a single intelligent window controller/driver 104 for local distributed control, or a single command and communication device 106 for both local and network distributed control. Or, an intelligent window controller/driver 104 could be combined with the command and communication device 106, in a further embodiment for small systems that use both local control and network information. Large systems, e.g., for multiple occupant buildings, could have multiple command and communication devices 106, e.g., one for each occupant or set of occupants, or each floor or level in the building, etc. Upgrades or expansions are readily accommodated by the addition of further components according to the situation.

In one embodiment as shown in FIG. 1, the command and communication device 106 has a wireless interface 128, a wired interface 130, a control system 118, a rules engine 132, a network interface 134, and a user I/O (input/output) module 142. The wireless interface 128 and/or the wired interface 130 are used for coupling to the intelligent window controller/driver(s) 104. The network interface 134 is used for connecting to the network 110. For example, the network interface 134 could connect to a wireless router or Wi-Fi, e.g., via the wireless interface 128, or to a wired network via the wired interface 130. In some embodiments, the wireless interface 128 and/or the wired interface 130 can couple to third-party devices for sensing, input and/or output (see, e.g., description regarding FIG. 3). The rules engine 132 uses information from the network 110, which can include direction from the fourth control system 120 in the server 108, and can include information from user devices 136, other systems 138, or big data 112, to create, populate, modify, or adapt various rules for operation of the smart windows 102. The user I/O module 142 accepts user input, e.g., via buttons, a touchscreen, etc., and displays user output, e.g., via a display screen or with LEDs or other lamps, etc. Some embodiments may lack the user I/O module 142, or have a user input module or an output module. In keeping with the nature of this distributed control system, the third control system 118 of the command and communication device 106 can direct operation of the smart windows 102, the second control system 116 of the intelligent window controller/driver(s) 104 can direct operation of the smart windows 102, the fourth control system 120 of the server 108 can direct operation of the smart windows 102, and/or the first control system 114 of each smart window 102 can direct operation of that smart window 102, in various combinations. Some embodiments have a failover mechanism, in which control and/or communication are routed around a failed device in the system.

As shown by the dashed lines, communication can proceed amongst various members of the smart window system over various paths, in various embodiments. In some embodiments, a message or other communication is passed along a chain, such as from a smart window 102, to an intelligent window controller/driver 104, or via the intelligent window controller/driver 104 to the command and communication device 106, and vice versa. In some embodiments, a device can be bypassed, either by direct communication between two devices or by a device acting as a relay. For example, a smart window 102 could communicate directly with a command and communication device 124 wirelessly via the wireless interface 128 or via the wired interface 130. Or, an intelligent window controller/driver 104 could relay a message or other communication, as could the command and communication device 106. In some embodiments, messages or communications can be addressed to any component or device in the system, or broadcast to multiple devices, etc. This could be accomplished using packets for communication, and in some embodiments any of the control systems 114, 116, 118, 120 can communicate with the cloud, e.g., the network 110.

Figure 2:
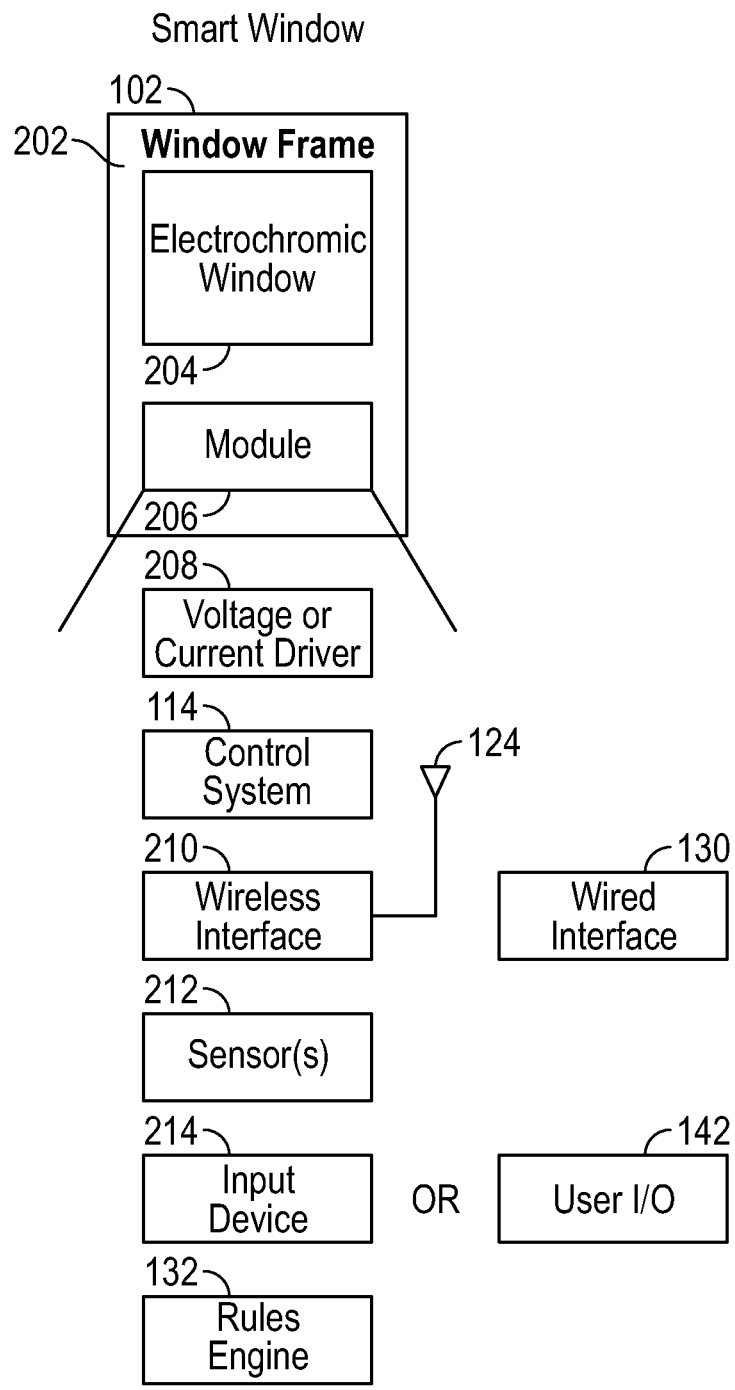
FIG. 2 is a system diagram of a smart window that has an electrochromic window and a window frame with an embedded module.

FIG. 2 is a system diagram of a smart window 102 that has an electrochromic window 204 and a window frame 202 with an embedded module 206. The embedded module 206 could be positioned at the bottom, top, to one or both sides, or distributed around the window frame 202 in various embodiments. The embedded module 202 has one or more sensors 212, which could include temperature, light, audio/ acoustic (i.e., sound), vibration, video or still image, motion, smoke detection, chemical, humidity or other sensors, and which could be facing inwards, i.e., into a room, or outwards, i.e., to the exterior of the room or building, in various embodiments. The wireless interface 128 has an antenna 124, which is used for coupling to the intelligent window controller/driver(s) 104, the command and communication device 106, and/or one or more user devices 136 (e.g., a smart phone, a user wearable device, etc.). A wired interface 130 could also be included, or could be used in place of a wireless interface 128. The control system 114, shown as the first control system 114 in FIG. 1, provides local control for the electrochromic window 204 via the voltage or current driver 208. Alternatively, the control system 114 participates in distributed control. Some embodiments have a rules engine 132 in the module 206. The voltage or current driver 208 sends voltage or current to bus bars of the electrochromic window 204, as directed by one or more of the control systems 114, 116, 118, 120, to control transmissivity of the electrochromic window 204. In some embodiments, to change transmissivity of the electrochromic window 204, the voltage or current driver 208 provides constant current until a sense voltage of the electrochromic window 204 is reached. Then, the voltage or current driver 208 provides a current that maintains the sense voltage at a constant voltage, until a total amount of charge is transferred to the electrochromic window 204 for the new transmissivity level. The embedded module 206 also includes an input device 214, or a user I/O module 142, through which user input can be entered at the smart window 102. In some embodiments, user input can also be entered through the wireless interface 128, e.g., from a smart phone.

Figure 3:
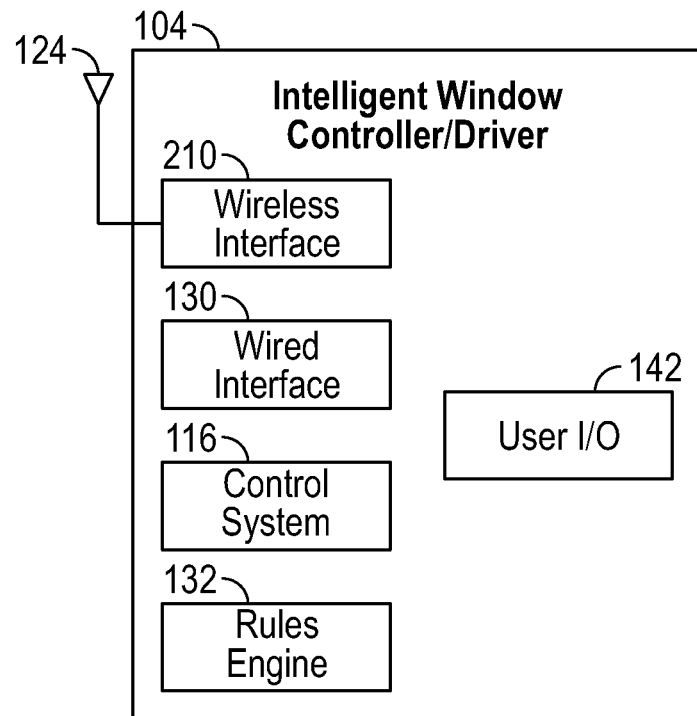
FIG. 3 is a system diagram of an intelligent window controller/driver, from the smart window system of FIG. 1.

FIG. 3 is a system diagram of an intelligent window controller/driver 104, from the smart window system of FIG. 1. The intelligent window controller/driver 104 includes a wireless interface 128 with an antenna 124, a wired interface 130, a user I/O module 142, and a control system 116, which is shown as the second control system 116 in FIG. 1. Some embodiments have a rules engine 132. The wireless interface 128 couples to one or more smart windows 102 via the wireless interface 128, as shown in FIG. 1, although the wired interface 130 could be used in further embodiments. Either the wireless interface 128 or the wired interface 130 can be used to couple to the command and communication device 106, in various embodiments. In some embodiments, the wireless interface 128 and/or the wired interface 130 can couple to further devices, such as third-party devices for input information, sensing or control output. For example, the system could control or interact with lighting controllers, HVAC (heating, ventilation and air-conditioning, e.g., by coupling to a thermostat), burglar and/or fire alarm systems, smart phones, or other systems or devices, or receive further input from further sensors, cameras, etc. The user I/O module 142 could include buttons, a touchpad, a touchscreen, a display screen, etc., for user input to the system and/or output from the system. The second control system 116 participates in distributed control with the first control system 114 of the smart window 102, or can override the first control system 114. In some embodiments, the second control system 116 relays direction from the third control system 118 of the command and communication device, or the fourth control system 120 of the server 108, to one or more smart windows 102.

Figure 4:
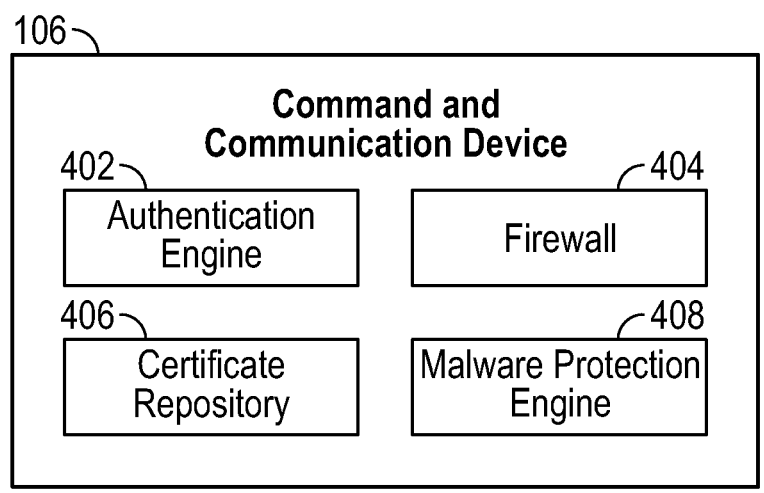
FIG. 4 is a system diagram of a command and communication device, from the smart window system of FIG. 1.

FIG. 4 is a system diagram of a command and communication device 106, from the smart window system of FIG. 1. Since the command and communication device 106 is coupled to the network 110, in some embodiments the command and communication device 106 has various protections against unauthorized access. Here, the command and communication device 106 has a firewall 104, a malware protection engine 408, an authentication engine 402, and a certificate repository 406. The firewall 104 is applied in a conventional manner, to communications arriving via the wired interface 130 or the wireless interface 128 (see FIG. 1).

The authentication engine 402 can be applied to authenticate any component that is coupled to or desires to couple to the command and communication device 106. For example, each smart window 102 could be authenticated, each intelligent window controller/driver 104 could be authenticated, and the server 108 could be authenticated, as could any user device 136 or other system 138 attempting to access the smart window system. The command and communication device 106 can authenticate itself, for example to the server 108. To do so, the command and communication device 106 uses a certificate from the certificate repository 406 for an authentication process (e.g., a "handshake") applied by the authentication engine 402.

The malware protection engine 408 can look for malware in any of the communications received by the commanded communication device 106, and block, delete, isolate or otherwise handle suspected malware in a manner similar to how this is done on personal computers, smart phones and the like. Updates, e.g., malware signatures, improved malware detection algorithms, etc., are transferred to the malware protection engine 408 via the network 110, e.g., from the server 108 or one of the other systems 138 such as a malware protection service.

Figure 5:
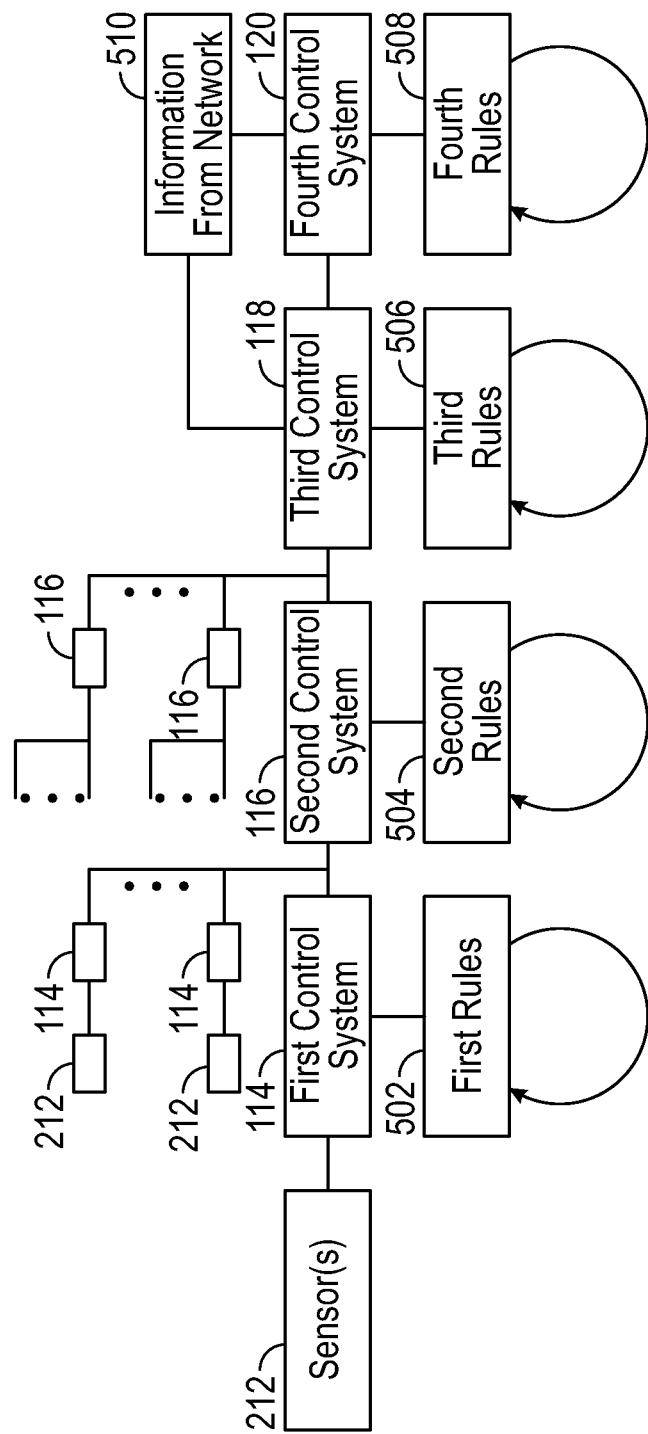
FIG. 5 is a block diagram showing aspects of the distributed device network control system architecture of FIG. 1.

FIG. 5 is a block diagram showing aspects of the distributed device network control system architecture of FIG. 1. Although this architecture lends itself to hierarchical control, which is nonetheless possible and can be performed by overrides from components higher up in the chain, it should be appreciated that control is generally distributed across and movable among the first control system(s) 114, the second control system(s) 116, the third control system 118 and the fourth control system 120, i.e., distributed across and movable among the server 108, the command and communication device 106, the intelligent window controller/drivers 104, and the smart windows 102. Smart windows 102 can be operated individually, or in various groups (e.g., facing in a particular direction, or associated with a particular room or group of rooms, or level or floor of a house or other building, subsets or groupings of windows, and so on) using this distributed control architecture. Generally, each control system 114, 116, 118, 120 controls or directs one or more of the smart windows 102, in cooperation with other members of the system. Each control system 114, 116, 118, 120 has respective rules, e.g., the first control system 114 has first rules 502, the second control system has second rules 504, the third control system 118 has third rules 506, the fourth control system 120 has fourth rules 508. Each control system 114, 116, 118, 120 operates according to its local rules, which may incorporate rules distributed from other devices, unless overridden by another device in the system. Rules can include cooperation with other devices, and rules can include instructions allowing for when an override is permissible. For example, an intelligent window controller/driver 104 could override a smart window 102, the command and communication device 106 could override an intelligent window controller/driver 104 or a smart window 102, the server 108 could override the command and communication device 106, an intelligent window controller/driver 104, or a smart window 102, or user input at one of the devices or from a user device 136 could override one or more of these. Information from the sensors 212 of the smart window(s) 102 enters the system through the first control system(s) 114, and can be routed or directed to any of the further control systems 116, 118, 120. Information 510 from the network enters the system through the fourth control system 120, i.e., the server 108, and/or the third control system 118, i.e., the command and communication device 106, and can be routed or directed to any of the further control systems 114, 116. User input can enter the system through the smart windows 102, e.g., through user input at that smart window 102 or wireless user input from a user device 136 to the smart window 102. User input can also enter the system through the intelligent window controller/driver(s) 104, e.g., through user input at the intelligent window controller/driver 104 or wireless user input from a user device 136. User input can enter the system through the third control system 118, e.g., through a wireless coupling from a user device 136 or via the network connection, e.g., from a user device 136. User input can enter the system through the fourth control system 120, e.g., via the server 108. From any of these entry points, the user input can be routed to any of the control systems 114, 116, 118, 120. Each of the control systems 114, 116, 118, 120 can communicate with each other control system 114, 116, 118, 120, and can update respective rules 502, 504, 506, 508 as self-directed or directed by another one or combination of the control systems 114, 116, 118, 120. Control can be cooperative, voted, directed, co-opted, overridden, local, distributed, hierarchical, advisory, absolute, and so on, in various combinations at various times during operation of the system, in various embodiments.

In some embodiments, the smart window system operates the smart windows 102 in a continuous manner, even if there is a network 110 outage (e.g., there is a network outage outside of the building, a server is down, or a wireless router for the building is turned off or fails, etc.). The first control system 114, the second control system 116 and/or the third control system 118 can direct the smart windows 102 without information from the network, under such circumstances. In various combinations, each of the control systems 114, 116, 118, 120 can create, store, share and/or distribute time-bound instructions (e.g., instructions with goals to perform a particular action at or by a particular time), and these time-bound instructions provide continuity of operation even when one or more devices, or a network, has a failure. When the network 110 is available, the third control system 118 obtains weather information from the network, either directly at the third control system 118 or with assistance from the server 108. For example, the third control system 118 could include and apply cloud-based adaptive algorithms. With these, the third control system 118 can then direct operation of the smart windows 102 based on the weather information. One or a combination of the control systems 114, 116, 118, 120 can direct operation of the smart windows 102 based on sensor information, such as from light, image, sound or temperature sensors of the smart windows 102. For example, if the weather information indicates cloud cover, or sensors 212 are picking up lowered light levels, the system could direct an increase in transmissivity of the smart windows 102, to let more natural light in to the building. If the weather information indicates bright sun, or sensors 212 are picking up increased or high light levels, the system could direct a decrease in transmissivity of the smart windows 102, to decrease the amount of natural light let in to the building. The system can modify such direction according to orientation of each window, so that windows pointing away from the incidence of sunlight are directed differently than windows pointing towards incidence of sunlight. If weather information indicates sunlight, and temperature sensors indicate low temperatures, the system could direct increased transmissivity of the smart windows 102, in order to let in more natural light and increase heating of a building interior naturally. Or, if the temperatures sensors indicate high temperatures, the system could direct decreased transmissivity of the smart windows 102, to block natural light and thereby hold down the heating of the interior of the building by sunlight.

FIGS. 6A-6F illustrate various models and a comparison engine, some or all of which could be used in various combinations in embodiments of the smart window system. Each of these embodiments could be placed in various locations in the smart window system, as further discussed below with reference to FIG. 6F.

Figure 6A:
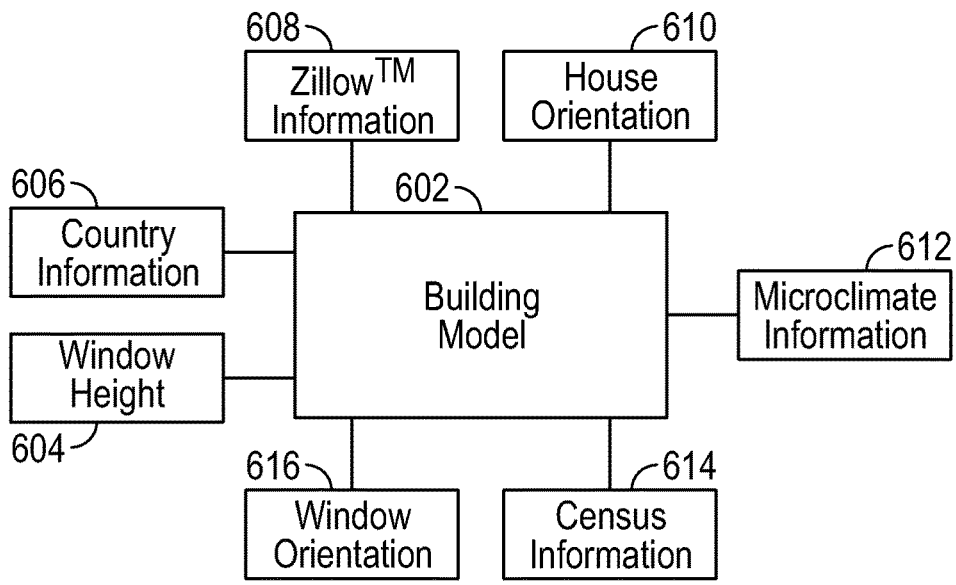
FIG. 6A shows aspects of a building model that can be used in embodiments of the smart window system.

FIG. 6A shows aspects of a building model 602 that can be used in embodiments of the smart window system. The building model 602 represents placement of each of the smart windows 102 in a particular installation of a window system, e.g., in a house or building. Some or all of the aspects shown in FIG. 6A, or further aspects or variations thereof, could be present in a specific building model 602. Window orientation 616 could be represented by compass bearing of each smart window 102, or positioning or location information for each smart window 102 relative to the building in which the smart window 102 is installed. This could be automatically determined based on information from one or more sensors 212 of the smart window, or by user entry of information such as a floor plan of the building or other information allowing the system to deduce the window orientation 616. Window height 604 could be deduced or user entered. County information 606 could be obtained from the network 110, and indicate location and orientation information for the entire building, or building plans, etc. Internet real estate sites may provide information 608 from the network 110, and indicate location information for the building. House orientation 610 could be mapped on site, user entered, deduced from sensor information obtained from the smart windows 102, or obtained from a smart phone application. Microclimate information 612 could be obtained from the network 110. Some embodiments of smart window systems contribute sensor information from the smart windows 102 to the server 108 (see FIG. 1), which then tracks microclimate weather and makes this information available back to smart window systems or others (e.g., subscribers or services). Census information 614 could be obtained from the network 110 and give location information for the building or occupant counts for the building, which could then be used for establishing the number of user profiles applicable to an installation of smart windows 102. Other sources and types of information could feed into the building model 602. For example, online map and photographic information could be used to establish relative locations and orientations of various smart windows 102 (or of windows prior to retrofitting with smart windows 102).

Figure 6B:
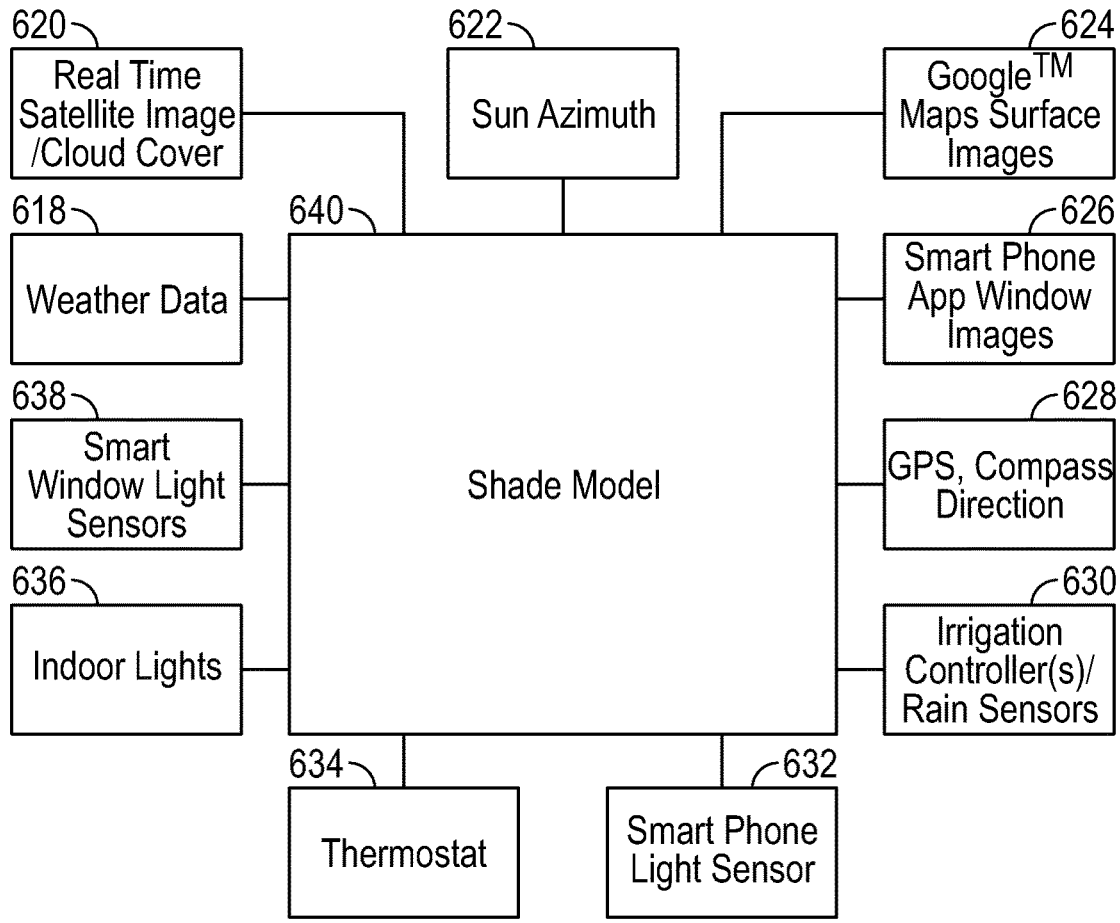
FIG. 6B shows aspects of a shade model that can be used in embodiments of the smart window system.

FIG. 6B shows aspects of a shade model 640 that can be used in embodiments of the smart window system. The shade model 640 represents aspects of shade (e.g., blocking of sunlight) affecting each smart window 102, groups of smart windows 102 (e.g., the smart windows 102 on the first story of a three-story building, or smart windows 102 facing in one direction), or the smart windows 102 of an entire building (e.g., with other buildings, nearby mountains or hills that could shade the entire building). It is not necessary that the shade model 640 represent the source of the shade (i.e., the shade model 640 does not need to know that it is a tree, a hillside or another building that is producing shade at a particular time of day for a particular window), although some embodiments could provide entry for such information. Some embodiments deduce the shade model 640 for each smart window 102, or group of smart windows 102, based on smart window light sensors information 638. Weather data 618 could be included in the shade model 640, as could real-time satellite image/cloud cover information 620 and sun azimuth information 622. With these sources of information, as obtained from the network 110 (e.g., the Internet), the smart window system can deduce whether the sun ought to be shining brightly on a window, but is not, in which case at that time of day and season under that weather condition, there could be shade on the smart window 102. Surface images 624 from an Internet map application could be used to provide information for the shade model 640. Smart phone application window images 626 could be input into the system, which could then deduce which windows are shaded at the time that the image was captured. GPS (global positioning system) and compass direction information 628 could be input to the system, for example from a smart phone with a GPS and compass function, or other instrument or device, or manually entered. This information is useful for determining orientation of a window 102 and incidence of sunlight relative to that smart window 102, whereupon the shade model 640 can deduce whether shade is affecting that smart window 102. Irrigation controllers or rain sensors information 630 could be used to deduce whether locally there is rain and attendant cloud cover, which is causing shade on likely all of the smart windows 102 of an installation. A smart phone light sensor 632 could provide input to the shade model 640, operating effectively as a light meter (e.g., deduced from an image capture or live image camera), so that the system can deduce when less light is incident on or passing through a window 102 than ought to be with direct sun shining, in which case there is shade, and so on. Thermostat information 634 could be used to deduce whether overall the room or building is receiving more or less incident sunlight than expected according to the weather data 618 or other relevant source of information about sunlight, and thereby deduce shade information. Indoor lights information 636 could be used to deduce whether overall the room or building is receiving more or less incident sunlight than expected, etc. Various single sources or combinations of the above sources of information are used in various embodiments to produce, update or modify the shade model 640.

Figure 6C:
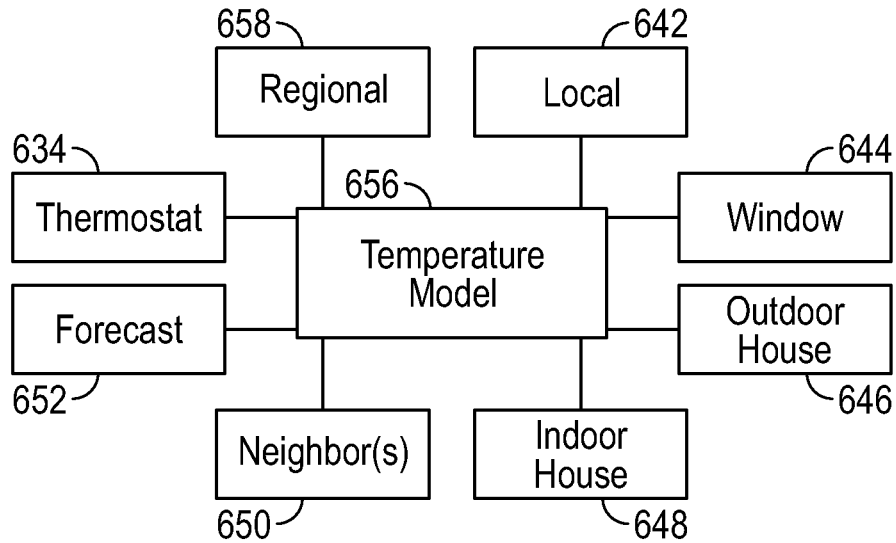
FIG. 6C shows aspects of a temperature model that can be used in embodiments of the smart window system.

FIG. 6C shows aspects of a temperature model 656 that can be used in embodiments of the smart window system. The temperature model 656 represents the temperature, and influences on the temperature, of one or more rooms or the entire building in which a window system is installed. Thermostat information 634 could be used to determine whether the user-intended (or desired) temperature for the inside of the room, house or building is higher or lower than might be naturally obtained or otherwise expected or predicted, or higher or lower than the indoor temperature as measured by the thermostat 634. For example, regional information 658 (e.g. whether information), local information 642 (e.g., microclimate information), outdoor house information 646 (e.g., from outward facing temperature sensors of smart windows 102 or other sources), and indoor house information 648 (e.g., from inward facing temperature sensors of smart windows 102 or other sources) can all be processed and compared, so that the temperature model 656 deduces whether the temperature is relatively low or high. The system can then make decisions as to whether transmissivity of specific smart windows 102, or all of the smart windows 102, should be increased or decreased to let more or less sunlight in, and to raise, lower or prevent from raising the indoor temperature as a result. Neighbor information 650 could be input to the temperature model 656, particularly where neighbors are using a smart window system which communicates with the server 108. Forecast information 652 can be applied to the temperature model 656, so as to make adjustments to transmissivity settings of smart windows 102 in advance of changes in weather. For example, if a cooling trend is predicted, the system might decide to increase transmissivity of the smart windows 102, to let more sunlight in and heat up the interior of the building. If a warming trend is predicted, the system might decide to decrease transmissivity of the smart windows 102, to decrease the amount of sunlight let in and avoid heating up the interior of the building.

Figure 6D:
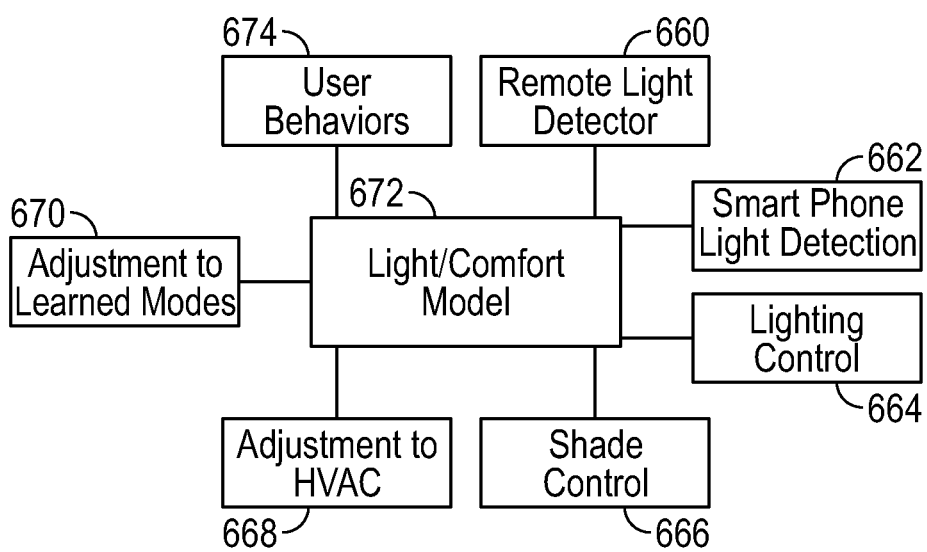
FIG. 6D shows a light and comfort model that can be used in embodiments of the smart window system.

FIG. 6D shows a light and comfort model 672 that can be used in embodiments of the smart window system. The light and comfort model 672 represents light levels in the interior of a room or building, and various influences on the light levels. User behaviors 674 are used by the light and comfort model 672 to understand when a user manually adjusts a smart window 102, enters preference information, or otherwise influences settings or adjustments of the system. A remote light detector 660, such as the smart phone light sensor 632, or another user device, could be used to independently measure light levels in a room or building. Smart phone light detection 662, such as the smart phone light sensor 632 could also be used to measure light levels in a room or building. Lighting control information 664, such as could be available when the smart window system includes a lighting controller or couples to a lighting controller, could be used by the system to observe when artificial lighting (i.e., not sunlight-based) is applied to the interior of a room or building. Shade control information 666, such as could be available when the smart window system includes or couples to a shade control device (see, e.g., FIG. 11), could be used by the system to observe when shade is deliberately applied to the interior of a room or building. Adjustment to HVAC (heating, ventilation or air conditioning) information 668 could be used by the system to observe when an occupant desires warmer or cooler temperatures. Adjustment to learned modes information 670 could be used by the system to deduce when they learned mode setting produced too much or too little natural (i.e., sunlight-based) light in a room or building. The system can use the light and comfort model 672 when determining whether to increase or decrease transmissivity of smart windows 102, to let more or less light in.

Figure 6E:
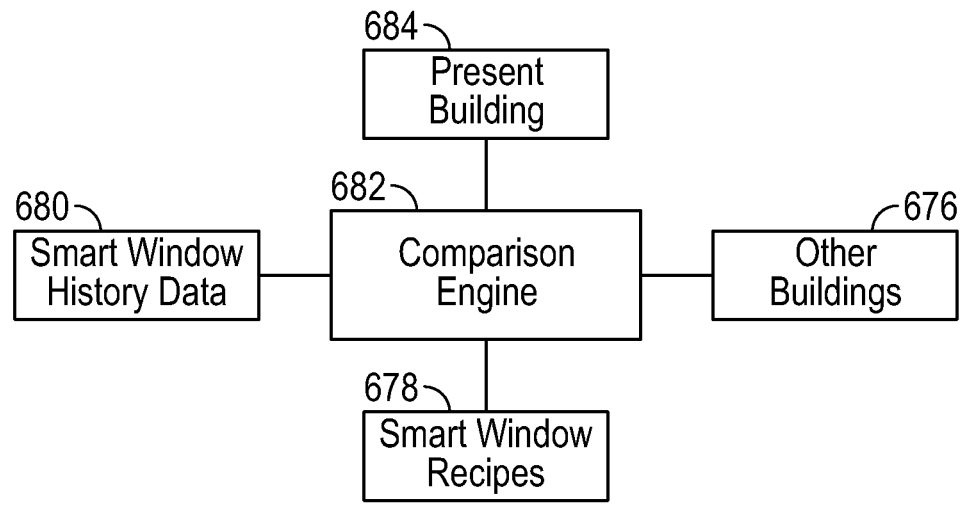
FIG. 6E shows a comparison engine that can be used in embodiments of the smart window system.

FIG. 6E shows a comparison engine 682 that can be used in embodiments of the smart window system. The comparison engine 682 can take present building information 684 (e.g., as applied to a specific smart window system), and other buildings information 676, and compare models, operation, user preferences, system performance, and other aspects of smart window systems from one installation to another. From the present building information 684 and the other buildings information 676, the comparison engine 682 can derive smart window "recipes" 678 (e.g., rules sets applicable to smart window systems). The system could also make use of smart window history data 680, for short, medium or long-term comparisons.

Figure 6F:
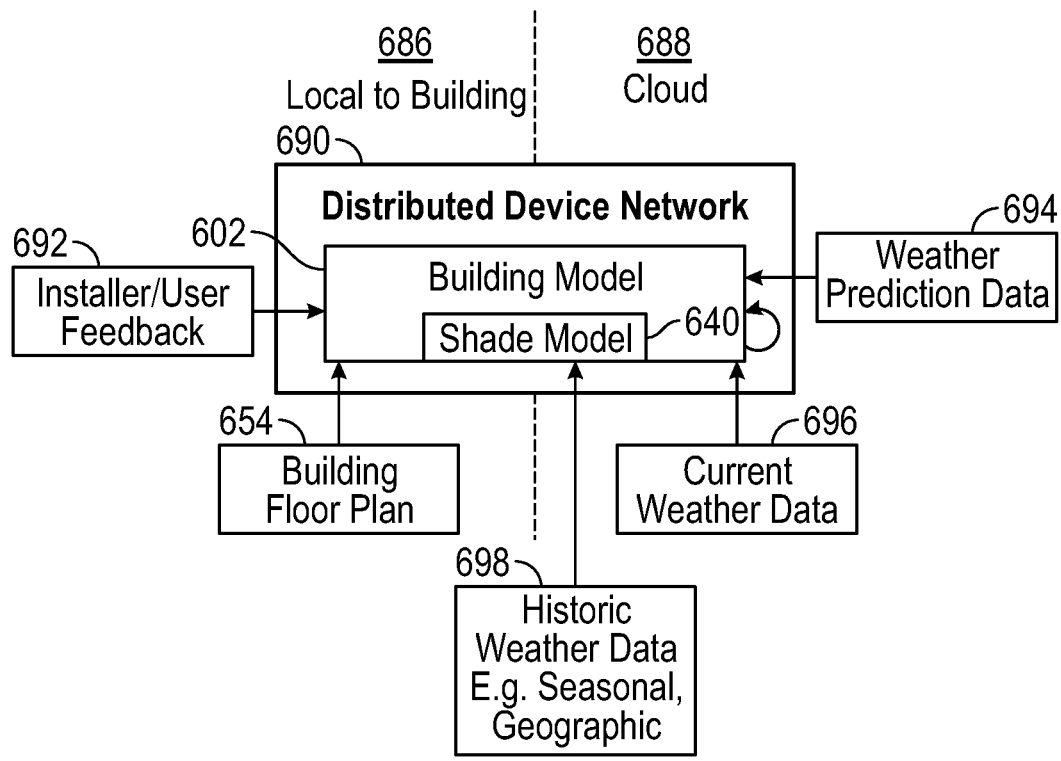
FIG. 6F shows the building model of FIG. 6A in the distributed device network of FIGS. 1 and 5, which could also include some or all of the models of FIGS. 6B-6D and the comparison engine of FIG. 6E, in various embodiments.

FIG. 6F shows the building model 602 of FIG. 6A in the distributed device network 690 of FIGS. 1 and 5, which could also include some or all of the models 640, 656, 672 of FIGS. 6B-6D and the comparison engine 682 of FIG. 6E, in various embodiments. Here, the building model 602 is shown as including the shade model 640, as will be further discussed with reference to FIG. 7. The distributed device network 690 resides partially local 686 to the building in which the smart windows 102 are installed, and partially in the cloud 688, in some embodiments. Referring back to FIG. 1, the first, second and third control systems 114, 116, 118 are local 686 to the building in which the smart windows 102 reside, and the fourth control system 120 is cloud-based, more specifically, located in the server 108 which is coupled to the network 110. The distributed device network 690 holds the building model 602, which can thus also be distributed across multiple control systems 114, 116, 118, 120 in the system. Conceptually, a portion of the building model 602 is generated and maintained locally, and a portion of the building model 602 is cloud-based. Local portion 686 influences to the building model 602 include installer and user feedback 692, and the building floor plan 654 or other information used to represent smart window 102 placement. Cloud portion 688 influences to the building model 602 include weather prediction data 694, current weather data 696, and historic weather data 698 (which could be seasonal or geographic or both).

FIG. 7 depicts a data structure 702 suitable for holding the building model 602 and other models 640, 656, 672 and comparison engine 682 of FIGS. 6A-6F in the distributed device network 690 with smart windows 102. The data structure 702 could have various fields 704, 706, 708, 712, 714 for various types of information. A building location field 706 holds latitude, longitude, GPS, ZIP Code and/or other building location information. The building model 602 has a window information field 704. In the example data structure 702 shown, each smart window 102 is numbered or otherwise identified, and the direction in which the smart window 102 is facing, the story in which the smart window 102 is located, a shade constraint, a glare constraint, a room designation, and general (e.g., as user entered or deduced by the system) and personal (e.g., per user, as user entered or deduced by the system) preferences are represented in the window information field 704. There are many formats and ways in which this or other information, or variations thereof could be represented, as readily devised by the person of skill in the art. Information could be represented for individual smart windows 102, or groups, etc. A building information field 708 has information for the front, back, and each side of the building, such as which direction each wall is facing, how many stories are on that wall (e.g., a split level house could have one story for the back of the building, two stories for the front of the building and a split one and two stories for the sides of the building). An adjustment field 712 shows whether the day and night function is adjusted for latitude and seasons, whether weather report monitoring is on or off and whether local microclimate adjustments are on or off. For example, some users would prefer a clock-based schedule that does not vary per season, and others would prefer seasonal adjustments to the settings of the system. Some users would prefer to ignore the weather, others would rather the system compensate the settings for the weather. Further model fields 714 represent the shade model 640, the temperature model 656, and the lighting model 710, by room, by the smart windows 102 per room, and/or the building overall.

Figure 8:
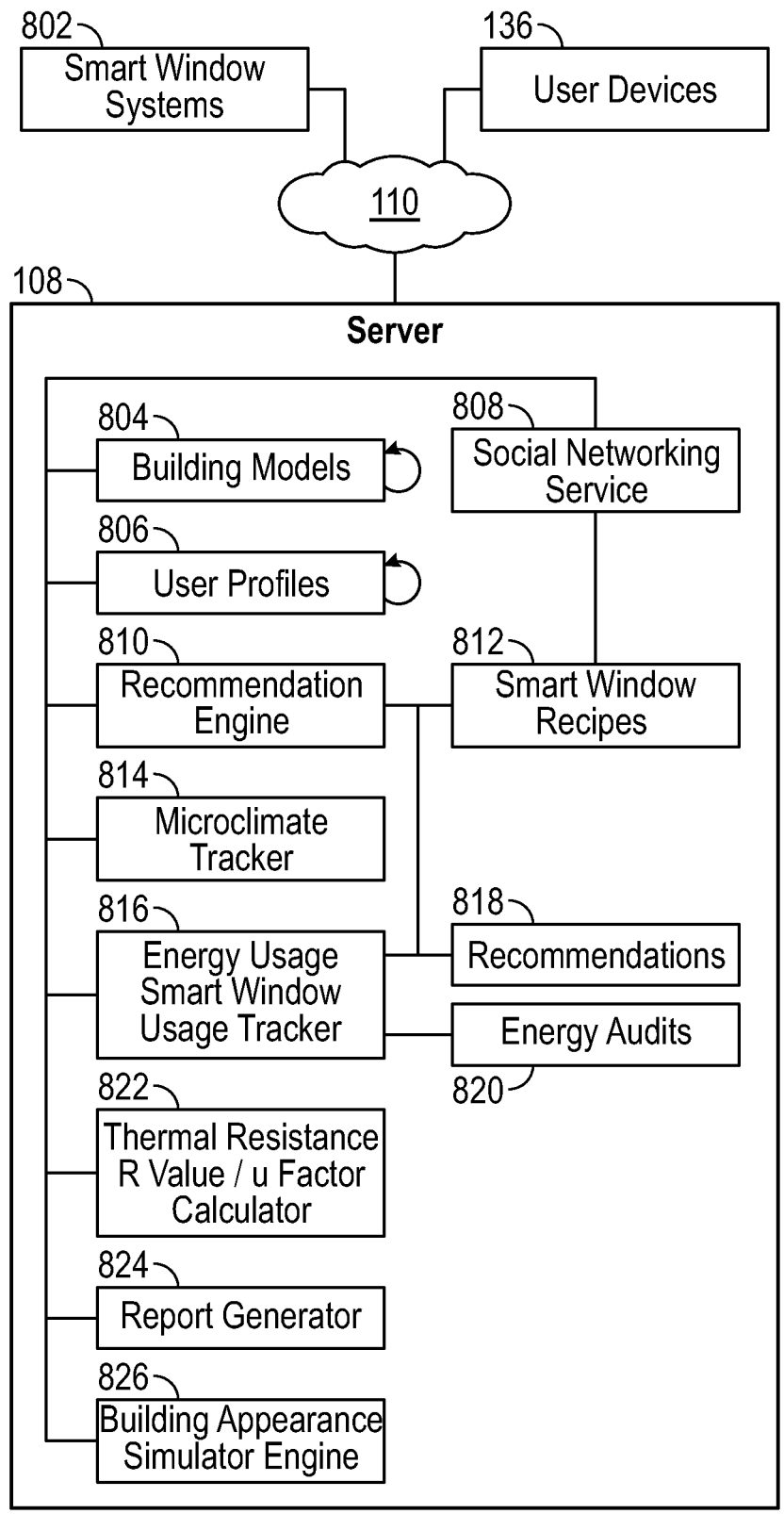
FIG. 8 is a system diagram of the server of FIG. 1, with various modules and repositories, as suitable for use with smart window systems.

FIG. 8 is a system diagram of the server 108 of FIG. 1, with various modules and repositories, as suitable for use with smart window systems. This is one embodiment, and variations with fewer, more, or differing combinations of features are readily devised. A building models repository 804 is where building models 602 are stored, in single or aggregate form. For example, a smart window system could store a local building model 602 in one of, or distributed across, the first control system 114, the second control system 116 and the third control system 118, with a duplicate copy of the local building model 602 stored in the building models repository 804 of the server 108 as part of the fourth control system 120 (see FIGS. 1 and 5). Or, each smart window system could have the building model 602 distributed across local components and the server 108. A user profiles repository 806 is where user profiles are stored in the server 108. Each of these is updated, revised or modified on an ongoing basis, which could be at regular or irregular time intervals or responsive to changes, etc.

A recommendation engine 810 generates smart window recipes 678 (see FIG. 6E), and stores these in a smart window recipes repository 812. The recipes 678 could include personal comfort models, energy efficiency models, preference models, profiles of smart window operation, etc. A social networking service 808 can gather smart window recipes 678 as shared by users of smart window systems, and store these in or access these for sharing from the smart window recipes repository 812. A microclimate tracker 814 receives sensor information from smart windows 102 of multiple smart window systems, and tracks microclimate based on the sensor information. Microclimate weather information could be made available by the server 108, to other systems or subscribers (e.g., for a subscription fee).

An energy usage and smart window usage tracker 816 communicates with utilities or building systems (e.g. HVAC) and tracks energy usage, and also tracks usage of smart window systems 802 that are coupled to the server 108 via the network 110. From this, the energy usage and smart window usage tracker 816 can generate recommendations 818, for example of smart window recipes 678 from the smart window recipes repository 812. This could make use of the comparison engine 682 (of FIG. 6E). The energy usage and smart window usage tracker 816 can also generate energy audits 820, which could accompany recommendations 818.

A thermal resistance R value/U factor calculator 822 looks at temperature differences inside and outside of a room or building, based on sensor information from sensors 212 of the smart windows 102, and possibly also based on communication with HVAC systems or thermostat information 634. Then, the thermal resistance R value/U factor calculator 822 calculates (e.g., estimates) the thermal resistance (e.g., the R value) or its inverse, the thermal transmittance (e.g., the U factor).

A report generator 824 could generate reports of various aspects of system operation, such as which smart windows 102 have frequent manual adjustments, or which smart windows 102 are allowed to self-adjust without much manual adjustment. The report generator 824 could report which smart windows 102, or how many smart windows 102, have operation consistent with a recommendation based on the shade model 640, or report a ratio of the number of smart windows 102 that have such operation as compared to the number of smart windows 102 that have operation inconsistent with the recommendation. A report could include a recommendation, based on a finding that some of the smart windows 102 are operated in a manner that is less energy efficient. Other types of reports are readily devised.

A building appearance simulator engine 826 renders images of buildings with smart windows 102, to show how a building would appear with changes to transmissivity settings of the smart windows 102. This could be accomplished by having the server 108 receive a captured image, or video, of a building that has smart windows 102. For example, a user could use a camera of a smart phone or other user device 136, and send a picture of a building to the server 108 via the network 110. The server could then coordinate with the appropriate (i.e., corresponding) one of the building models 602 in the building models repository 804, or use pattern recognition or other computing technique, to identify windows in the captured image or video. A user communicating with the server 108, for example via a user device 136 and the network 110, could use a touchscreen or cursor manipulation to indicate a selection of one or more smart windows 102 in the image, and then indicate a new setting or a pattern for one or more smart windows 102. The building appearance simulator engine 826 would then render an image simulating the appearance of the building with the new transmissivity settings for the smart windows 102. This simulated appearance rendered image could be termed a type of "augmented reality" depiction. In some embodiments, the user device 136 communicates to the smart window system (e.g., a specific installation at a specific building), and directs the smart window system to set transmissivity of specific smart windows 102 in accordance with the rendered image, thereby reproducing the simulated appearance of the building in the actual appearance of the building with the smart windows 102. An example of this is shown and described with reference to FIG. 14.

Figure 9:
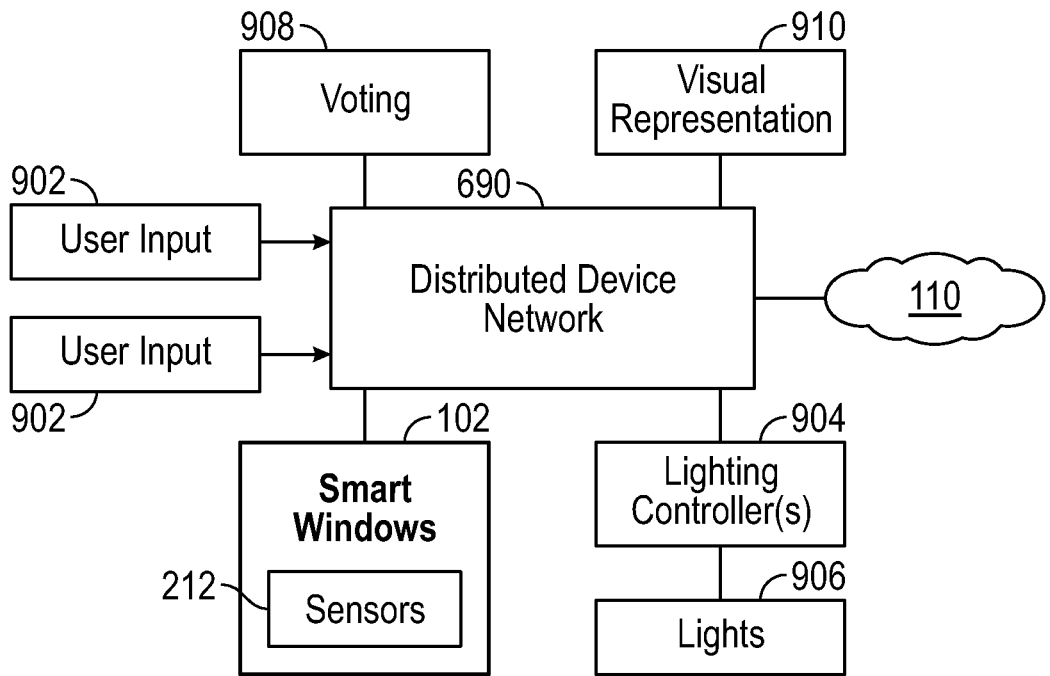
FIG. 9 is a system diagram of the distributed device network of FIGS. 1, 5 and 6F interacting with smart windows and lights, in a cooperative system with voting and visual representation for users of a smart window system.

FIG. 9 is a system diagram of the distributed device network 690 of FIGS. 1, 5 and 6F interacting with smart windows and lights, in a cooperative system with voting and visual representation for users of a smart window system. Some or all of the aspects of this embodiment are available in further embodiments, in various combinations. The distributed device network 690 couple to and communicates with, or integrates one or more lighting controller(s) 104, which couple to various lights 906. As described above, the smart window system, e.g. the distributed device network 690, operates the smart windows 102 based on input from the sensors 212, information from the network 110, and various user inputs 902. In this embodiment, the system votes on user inputs 902, using voting 908. Various voting schemes or mechanisms could be implemented using one or more of the control systems 114, 116, 118, 120 of the distributed device network 690. Based on results of the voting 908, the system sets transmissivity of one or more smart windows 102 and/or sets lighting levels of one or more lights 906. One goal of such a system would be to achieve an overall combination of natural lighting and artificial lighting that is preferred by a majority of the users, per the voting 908. Voting 908 could also be applied in embodiments with the building appearance simulator engine 826 described with reference to FIG. 8 and/or the pattern displays described below with reference to FIG. 14. To guide the users who are directing lighting levels or building appearance using the voting 908, the system could employ the building appearance simulator engine 826 to generate a visual representation 910 showing an interior or exterior simulated appearance based on either an individual requested setting for selected smart windows 102, or the voted setting for selected smart windows 102. This visual representation 910 (e.g., a rendered image in an appropriate image format) could be sent by the system to any of the user devices 136, or, in embodiments of the smart window system with one or more displays (e.g., on an intelligent window controller/driver 104 or the command and communication device 106), a system device could display the visual representation 910.

Figure 10:
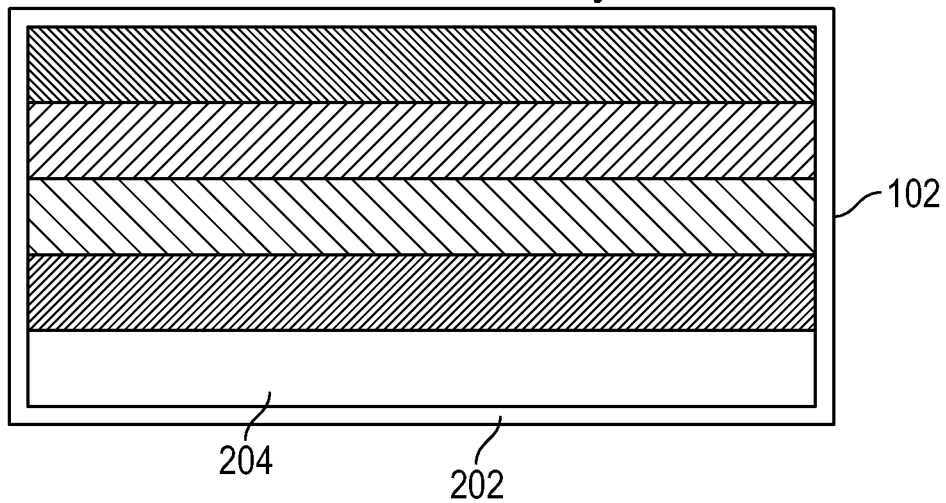
FIG. 10 shows an embodiment of a smart window with transmissivity gradation.

FIG. 10 shows an embodiment of a smart window 102 with transmissivity gradation. The electrochromic window 204 in this embodiment has multiple zones, each controllable independently of others as to transmissivity. For example, zones could be bounded by bus bars, with voltage between bus bars of a zone, or current through bus bars of a zone, controlling transmissivity of that zone of electrochromic material. Or, the electrochromic window 204 could have multiple panes, with each pane independently controllable as to transmissivity. In the example shown, the uppermost zone or pane is set to low or minimum transmissivity, and successive zones or panes are set to higher transmissivity, with the lowermost zone or pane set to still higher or maximum transmissivity, so that the lower portions of the smart window 102 let in more light or view than the upper portions of the smart window 102. This is useful for letting in light without dazzling or blinding a user who is seated near the smart window 102, e.g., at a desk or table, who wishes natural lighting for the desk, table or other surroundings, but less sunlight into his or her eyes. In this example, the zones or panes are laid out horizontally, but further embodiments could have vertical or diagonal layouts for zones or panes, or curved layouts (e.g. circular, oval, half circle, half oval, and so on).

Figure 11:
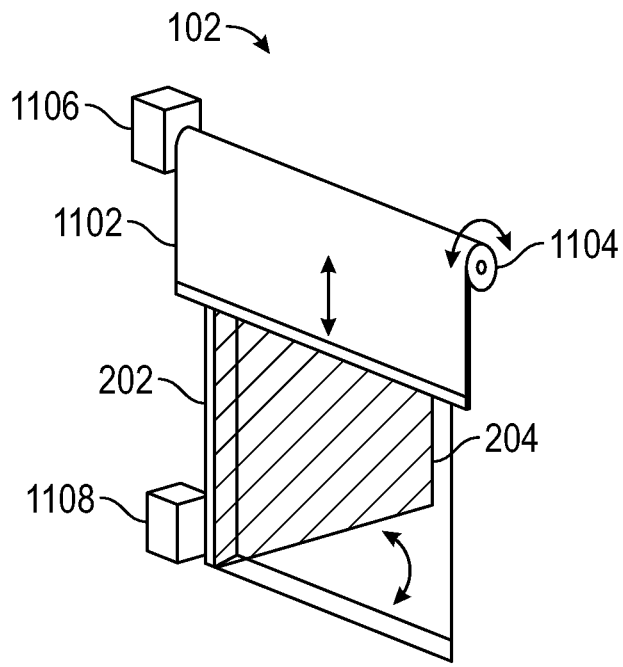
FIG. 11 shows an embodiment of a smart window with a motorized window blind and motorized opening and closing.

FIG. 11 shows an embodiment of a smart window 102 with a motorized window blind 1102 and motorized opening and closing. Generally, smart windows 102 could have multiple features besides of electrochromic windows 204, and this embodiment shows two possibilities. A first motor 1106 operates the window blind 1102 up and down, under control of the embedded module 206 (see FIG. 2) specifically, and the distributed device network 690 generally. Further embodiments could have a window blind operated from side to side, or at other angles, or motorized drapes, shutters, etc., as shade control. A second motor 1108 operates the electrochromic window 204 to swing open and closed, or, alternatively, up and down or in and out, or with a two pane split opening outwards or inwards and closing, etc. This, too, is controlled by the embedded module 206 and the distributed device network 690. In various scenarios, a smart window system could control opening and closing of smart windows 102 for natural ventilation and/or could control window blinds 1102 or related features along with controlling transmissivity of smart windows 102, for user comfort.

Figure 12:
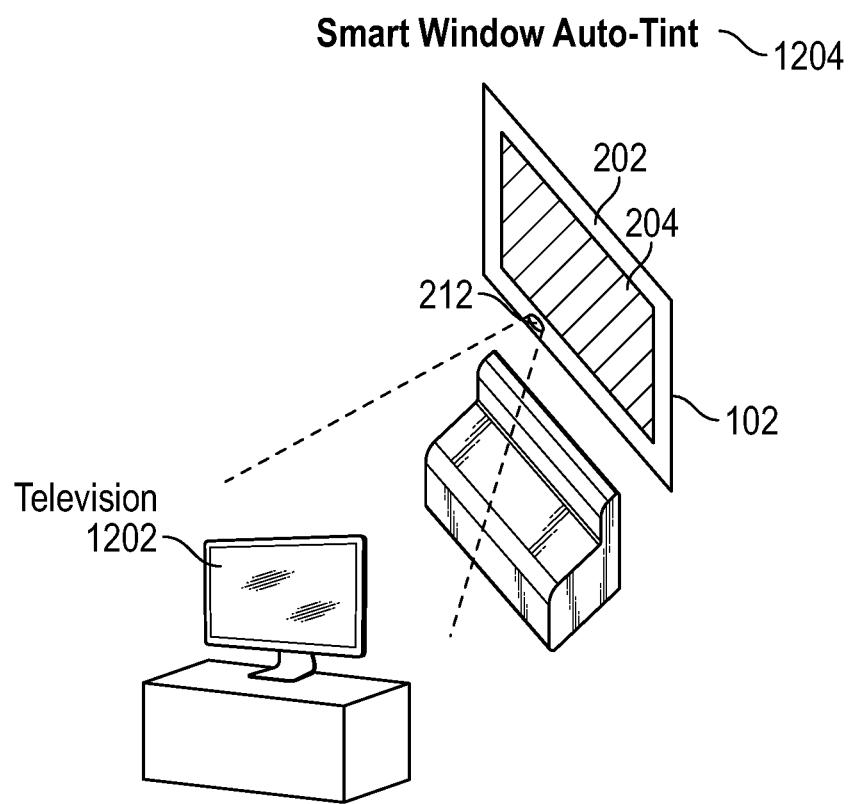
FIG. 12 shows an embodiment of a smart window with an auto-tint function.

FIG. 12 shows an embodiment of a smart window 102 with an auto-tint 1204 function. As in other embodiments, the smart window 102 has one or more sensors 212. In this scenario, the sensor(s) 212 receive light and/or sound from a nearby television 1202 in operation. The smart window system deduces that the television 1202 is on (e.g., by looking for the flicker of light or the variety of sounds associated with television operation, or by processing a captured or video image from a camera as a sensor 212), and determines which smart window 102 is nearest the television 1202 (e.g., by comparing sound levels or light levels from sensors 212 of smart windows 102, or processing images). Next, the smart window system directs that nearest smart window 102, or a group of smart windows 102 (e.g., assigned to a specific room), to decrease transmissivity. With this action, the auto-tint 1204 function reduces sunlight glare and overall natural light levels in the vicinity of the television 1202, for more pleasant viewing. The auto-tint 1204 function could be applied in further scenarios, such as with the system detecting various user activities.

Figure 13:
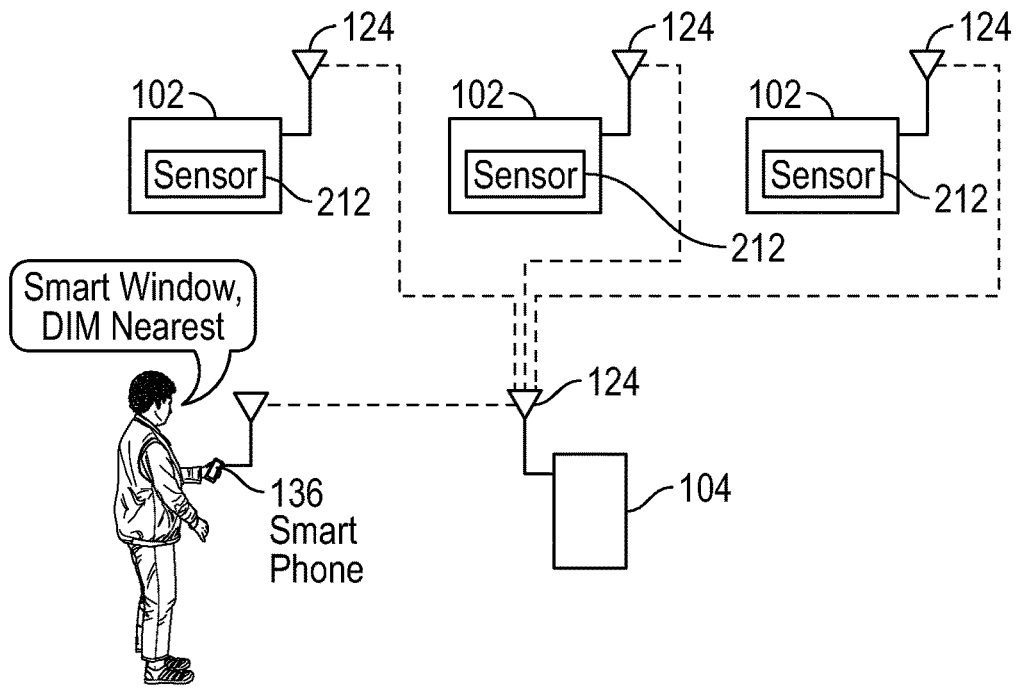
FIG. 13 shows an embodiment of a smart window system with voice control and a nearest window location function.

FIG. 13 shows an embodiment of a smart window system with voice control and a nearest window location function. A smart phone or other user device 136 is communicating with the smart window system, for example by wirelessly coupling to an intelligent window controller/driver 104 or the command and communication device 106. The smart phone or other user device 136 has speech recognition, and recognizes a user giving directions such as to dim the nearest smart window 102. Alternatively, sensors 212 of smart windows 102 receive sound from a user, and an embodiment of the smart window system could have speech recognition built-in. By comparing sound levels at multiple smart windows 102, based on input from the sensors 212, the smart window system deduces which smart window 102 is closest to the user who is speaking, and directs that smart window 102 to decrease transmissivity as directed by the user. Voice control and the nearest window location function can be applied to other voice commands, such as brightening the nearest window, dimming or brightening all the windows in the room, multiple rooms or the entire building, or use of other phrases and instructions relevant to the smart windows 102.

Figure 14:
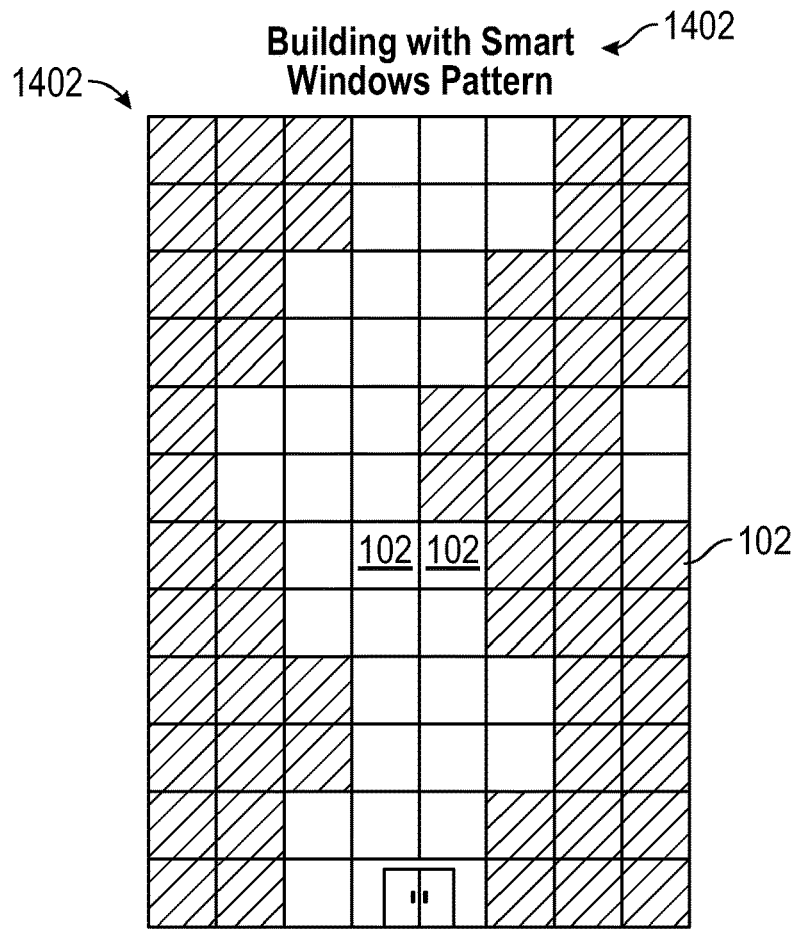
FIG. 14 depicts a building with a smart windows pattern.

FIG. 14 depicts a building with a smart windows pattern 1402. In various embodiments, all of the smart windows 102 of an entire building are under control of a single distributed device network 690 (see FIGS. 1, 5 and 9), or multiple distributed device networks 690 couple together, e.g., via the network 110 and communicate amongst themselves. One or more users, singly, or with voting 908 as described with reference to FIG. 9, or with another cooperative mechanism, to display on the building exterior (or, in some embodiments, interior). For example, users communicate a pattern with user devices 136. The distributed device network(s) 690 direct each of the smart windows 102, e.g., of one face of the building, or all faces, etc., to change transmissivity in accordance with the pattern 1402, and the exterior of the building shows the pattern 1402 as depicted in FIG. 14. In some embodiments, the smart window system communicates a visual representation 910 (see FIG. 9) of the building with the pattern 1402, as generated by the building appearance simulator engine 826 (see FIG. 8), to one or more user devices 136. Many patterns 1402 are possible, and patterns 1402 could be developed, shared, e.g. through a social networking service 808 (see FIG. 8), and displayed for special events, holidays, different times of the day or day to day, etc. The specific pattern 1402 shown is by example only, and should not be seen as limiting.

Figure 15:
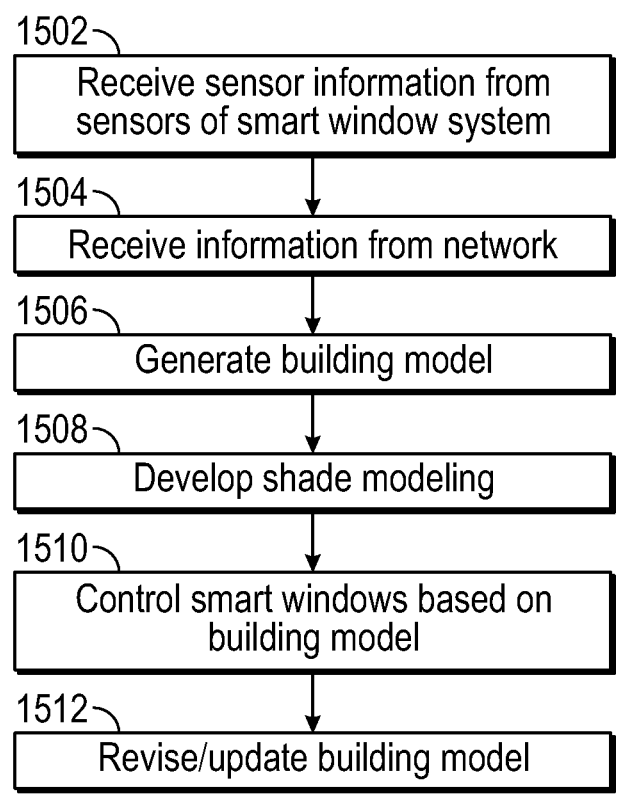
FIG. 15 is a flow diagram of a method of operating a smart window system.

FIG. 15 is a flow diagram of a method of operating a smart window system. The method can be practiced by embodiments of the smart window system, more specifically by one or more processors of a smart window system or a distributed device network that includes smart windows. In an action 1502, sensor information is received from sensors of the smart window system. These could be sensors embedded in the smart windows and/or sensors coupled to intelligent window controller/drivers. Various types of sensors are possible. In an action 1504, information is received from a network. This could be the global communication network known as the Internet, and could include sample profiles, weather information, seasonal or geographic information, etc. In an action 1506, a building model is generated. In an action 1508, shade modeling is developed. The building model and the shade modeling are based on the sensor information and the information received from the network. Other models are possible.

In an action 1510, smart windows are controlled based on the building model. Control of the smart windows is also based on sensor information, user input and information from the network. In an action 1512, the building model is revised or updated. Revision or updating of the building model is based on sensor information, user input and information from the network. This can be an ongoing process, or could be event driven or scheduled, etc. Flow proceeds back to the action 1510, to control the smart windows and revise or update the building model, in a loop. It should be appreciated that further actions could be added to the method, to add further features or refine actions with more detail, or branch to various routines, etc.

Figure 16:
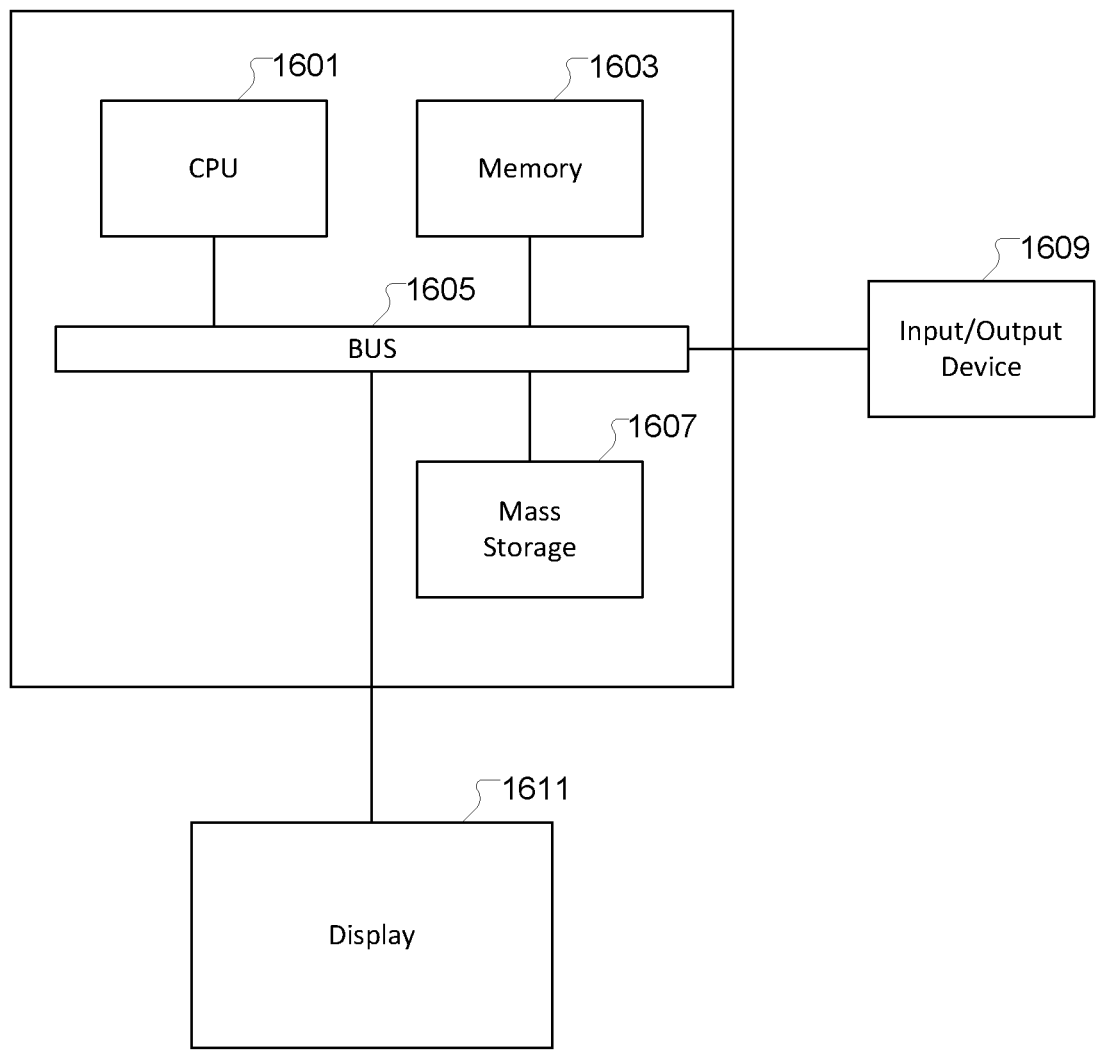
FIG. 16 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 16 is an illustration showing an exemplary computing device which may implement the embodiments described herein. The computing device of FIG. 16 may be used to perform embodiments of the functionality for the smart window system in accordance with some embodiments. The computing device includes a central processing unit (CPU) 1601, which is coupled through a bus 1605 to a memory 1603, and mass storage device 1607. Mass storage device 1607 represents a persistent data storage device such as a floppy disc drive or a fixed disc drive, which may be local or remote in some embodiments. Memory 1603 may include read only memory, random access memory, etc. Applications resident on the computing device may be stored on or accessed via a computer readable medium such as memory 1603 or mass storage device 1607 in some embodiments. Applications may also be in the form of modulated electronic signals modulated accessed via a network modem or other network interface of the computing device. It should be appreciated that CPU 1601 may be embodied in a general-purpose processor, a special purpose processor, or a specially programmed logic device in some embodiments.

Display 1611 is in communication with CPU 1601, memory 1603, and mass storage device 1607, through bus 1605. Display 1611 is configured to display any visualization tools or reports associated with the system described herein. Input/output device 1609 is coupled to bus 1605 in order to communicate information in command selections to CPU 1601. It should be appreciated that data to and from external devices may be communicated through the input/output device 1609. CPU 1601 can be defined to execute the functionality described herein to enable the functionality described with reference to FIGS. 1-15. The code embodying this functionality may be stored within memory 1603 or mass storage device 1607 for execution by a processor such as CPU 1601 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A smart window system, comprising:
a plurality of smart windows, each having at least one electrochromic window;
a plurality of sensors;
a control system coupling the plurality of smart windows and the plurality of sensors; and
the control system configured to couple to a network, and configured to generate a building model that includes information regarding the plurality of smart windows and is based on a profile of smart window operation received from the network and wherein the profile is revised based on information from the plurality of sensors, wherein the plurality of smart windows and the control system are configured to have local a first portion of the building model, and wherein a second portion of the building model is local to at least one server in the network.

2. The smart window system of claim 1, wherein the building model is based on environmental information from the network and based on installer or user input.

3. The smart window system of claim 1, wherein the building model includes shade modeling for each smart window of the plurality of smart windows.

4. The smart window system of claim 1, wherein the control system is configured to control transmissivity of each of the plurality of smart windows based on the building model.

5. The smart window system of claim 1, wherein the building model is adaptive and is based on a shade model and weather information.

6. The smart window system of claim 1, wherein the building model is based on at least one further building model from at least one further smart window system.

7. A smart window system, comprising:
a plurality of smart windows, each smart window of the plurality of smart windows having integrated into the smart window at least one sensor and at least one electrochromic window;
a control system that includes the plurality of smart windows and is configured to couple to a network;
the control system, configured to produce a building model based on a profile of smart window operation received from the network and wherein the profile is revised based on information from the at least one sensor or user input, and wherein the building model includes information regarding placements of the plurality of smart windows relative to a building.

8. The smart window system of claim 7, wherein a server in the network is configured to track microclimate weather based on sensor input from a plurality of smart window systems, and wherein the building model is based on the tracked microclimate weather.

9. The smart window system of claim 7, further comprising:
the control system, configured to store the building model in a data structure that references each smart window of the plurality of smart windows as to a shade model of the smart window.

10. The smart window system of claim 7, wherein a portion of the building model resides in the network.

11. The smart window system of claim 7, wherein the building model includes at least one of: a shade model, a temperature model, or a lighting model.

12. The smart window system of claim 7, further comprising:
the control system, configured to revise the building model on an ongoing basis.

13. The smart window system of claim 7, further comprising:
the control system, configured to compare temperature or lighting level, based on the information from the sensors of the plurality of smart windows, to a predicted temperature or a predicted lighting level, based on the building model, and report a result of such a comparison.

14. A method of operating a smart window system, performed by one or more processors of the smart window system, comprising:
receiving sensor information from sensors of the smart window system, wherein the smart window system includes a plurality of smart windows with electrochromic windows, and the sensors;
receiving information from a network;
generating, in the smart window system, a building model referencing each smart window of the plurality of smart windows with placement, location or orientation of the smart window, wherein at least a portion of the building model is based on the sensor information and the information from the network;
receiving, from the network, a profile of smart window operation;
basing the building model, at least in part, on the profile of smart window operation;
revising the building model, based on one of the sensor information or user input; and
controlling each smart window of the plurality of smart windows, based on the building model.

15. The method of claim 14, further comprising:
developing shade modeling for the building model, based on the sensor information and the information from the network.

16. The method of claim 14, further comprising:
revising the building model based on at least one of: historical weather data, current weather data, and predictive weather data, as received from the network.

17. The method of claim 14, further comprising:
receiving, from the network, a personal comfort model or an energy efficiency model; and
updating the building model based on the personal comfort model or the energy efficiency model.

18. The method of claim 14,
sending at least a portion of the sensor information to a server, via the network, wherein the server is configured to track microclimate weather based on sensor information from a plurality of smart window systems;

receiving microclimate weather information from the server, via the network; and updating the building model, based on the microclimate weather information.

* * * * *